Patented Aug. 25, 1953

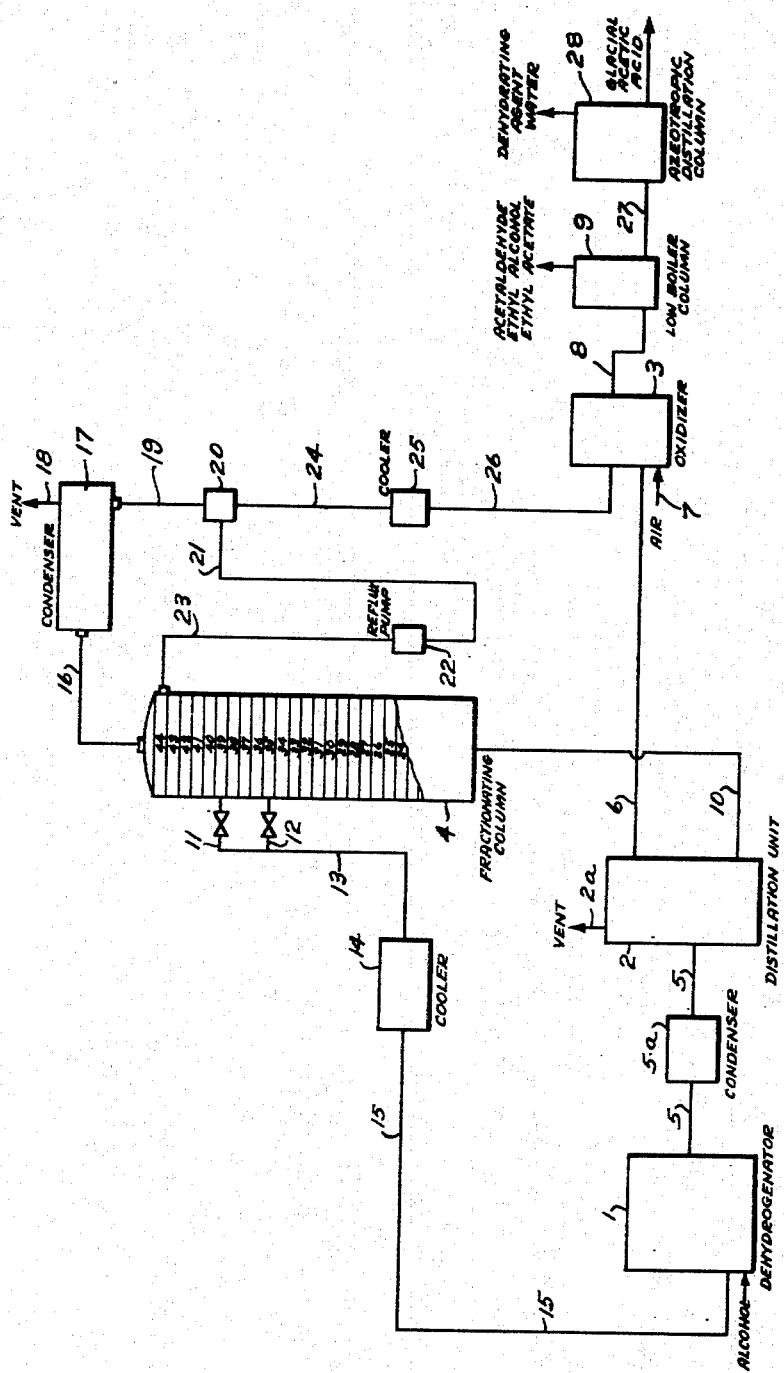

2,650,244

UNITED STATES PATENT OFFICE 2,650,244

PROCESS FOR PRODUCTION OF ACETIC ACID

Jacob L. Stein, Philadelphia, Pa., assignor to Publicker Industries Inc., Philadelphia, Pa., a corporation of Pennsylvania Application January 24, 1951, Serial No. 207,593

5 Claims. (Cl. 260—531)

The present invention relates to new and useful improvements in the production of acetic acid. It relates particularly to a process for the manufacture of glacial acetic acid in which ethyl alcohol is first dehydrogenated to form acetaldehyde and the aldehyde is then oxidized to the acetic acid.

In the production of acetic acid from ethyl alcohol, one of the side reactions is the formation of small amounts of ethyl acetate in the step of dehydrogenating alcohol to acetaldehyde.

A process of the manufacture of acetic acid from ethyl alcohol in which my invention is especially useful is shown and described in U. S. Patent No. 2,173,111 which issued on September 19, 1939 to Rudolph L. Hasche. In the process of the patentee, ethyl alcohol is catalytically dehydrogenated under dehydrogenating conditions to form a mixture which is substantially composed of unreacted alcohol, acetaldehyde and ethyl acetate together with some water. The acetaldehyde which has a boiling point of about 20.2° C. is distilled from the mixture and passed to a catalytic oxidizer where, in the presence of air, it is oxidized at a temperature of about 80° C. to acetic acid.

In the process of the patentee and in similar processes, the dehydrogenation of the ethyl alcohol is not complete but only approximately 30% by weight of the alcohol passing through the dehydrogenator is converted into acetaldehyde. During the dehydrogenation reaction certain quantities of ethyl acetate are formed in a side reaction or reactions. The output from the converter is then distilled to separate the acetaldehyde content therein. The residue from such distillation contains unconverted alcohol (constituting approximately 70% of the original alcohol), and certain amounts of ethyl acetate together with water formed in the dehydrogenator. The alcohol in the residue is usually concentrated by the removal of the water and this is done by mere distillation. The concentrated alcohol is then re-cycled to the dehydrogenation unit.

Since the boiling point of ethyl acetate is much closer to the boiling point of ethyl alcohol than it is to the boiling point of acetaldehyde (the boiling point of ethyl alcohol being 78.4° C., ethyl acetate 77.1° C. and acetaldehyde 20.2° C.), the ethyl acetate remains in the re-cycled ethyl alcohol and is not removed with the acetaldehyde.

Because its boiling point is so close to ethyl alcohol, the ethyl acetate was not separated from the re-cycled alcohol during the alcohol concentration step; but instead it was re-cycled with the alcohol. The re-cycled alcohol thus accumulated increasing amounts of ethyl acetate and, therefore, progressively large quantities of ethyl acetate were subjected to the conditions of the alcohol dehydrogenation as the process progressed.

Ethyl acetate, however, is unstable at the temperature of the alcohol dehydrogenation process which is about 480° C. The ethyl acetate that is present in the re-cycled alcohol is, therefore, subject to decomposition to produce gaseous CO, $CO_2$, carbon deposits on catalyst, and water. The alcohol equivalent of the ethyl acetate that is decomposed is lost to the process and results in lower yields of acetic acid. In addition, the carbon deposit on the catalyst shortens its cycle and necessitates more frequent cleaning of the screens or rehabilitation of the catalyst.

On the other hand, in the oxidation step the presence of ethyl acetate is not detrimental because at the comparatively low temperature of this reaction (about 80° C.) ethyl acetate is relatively stable and hence does not decompose into undesirable and yield-reducing by-products.

In the process as heretofore practiced, some of the alcohol after concentration by mere distillation was passed to the oxidation stage rather than being re-cycled to the dehydrogenation. As much as one-third of such unconverted alcohol from the dehydrogenator was passed in this manner to the oxidizer along with the acetaldehyde. By this practice, the build-up of ethyl acetate in the alcohol re-cycled to the dehydrogenator was somewhat reduced; for example, to a concentration of about 5% by weight of the re-cycled alcohol. The other two-thirds of the unconverted alcohol was re-cycled to the dehydrogenation unit, and during the dehydrogenation its ethyl acetate content was decomposed causing reduced yields in the process.

According to the present invention, in converting ethyl alcohol to acetic acid the alcohol which is re-cycled through the dehydrogenation unit is first made practically free of ethyl acetate before it is re-cycled through the dehydrogenation unit so as to maintain the yield of this unit at substantially its original level. The increase in the yield of acetic acid from the ethyl alcohol thus obtained is one of the principal advantages of my invention.

The invention is particularly useful in processes for the production of acetic acid and glacial acetic acid in which ethyl alcohol is first dehydrogenated under dehydrogenating conditions in which some ethyl acetate is formed and under which dehydrogenating conditions the ethyl acetate is subject to decomposition. It is especially useful in processes in which the dehydrogenation step is conducted at an elevated temperature at which the ethyl acetate is unstable.

For the purpose of illustrating the invention, there is shown in the accompanying drawing one form thereof which is at present preferred, although it is to be understood that the various instrumentalities of which the invention consists can be variously arranged and organized and that the invention is not limited to the precise arrangements and organizations of the instrumentalities as herein shown and described.

The flow sheet in the single figure in the accompanying drawing shows, in diagrammatic form, a process for the manufacture of glacial acetic acid from ethyl alcohol in which my invention is practiced. The basic process is similar to that disclosed in U. S. Patent No. 2,173,111, referred to above.

Referring now to the drawing, there is shown in combination a dehydrogenating unit 1, distillation unit 2, oxidizing unit 3 and the fractional distillation column 4.

Ethyl alcohol is led into the dehydrogenating unit 1 where, in a manner well known in the art such as is shown in U. S. Patent No. 2,173,111, it is passed over a dehydrogenating catalyst under dehydrogenating conditions and is converted into a mixture containing acetaldehyde, ethyl acetate, water and unreacted alcohol. The temperature at which the dehydrogenating reaction is conducted is about 480° C.

The products of the reaction from the dehydrogenator are passed through line 5 provided with condenser 5a to the distillation unit 2 where the acetaldehyde, which boils at 20.2° C., is distilled off and passes through line 6 from the distillation unit 2 to the catalytic oxidation unit 3. Uncondensed or uncondensable gases may be vented from condenser 5a or they may be vented from unit 2 through a vent 2a. In the oxidizing unit the acetaldehyde contacts an oxidizing catalyst and is oxidized under oxidizing conditions with oxygen, or an oxygen containing gas such as air, into acetic acid; the gas entering the oxidizer through line 7 at the bottom of this unit. From the oxidizing unit 3 the products of reaction from the oxidation are passed through line 8 to a low boiler unit 9 in which unreacted acetaldehyde, unreacted alcohol and ethyl acetate are distilled off, leaving behind a residue of crude acetic acid and water. This residue is passed through line 27 to azeotropic distillation 28 where a sufficient amount of a dehydrating agent, such as propyl alcohol and/or propyl acetate, is added to form an azeotropic mixture with the water in the residue. The azeotropic mixture is distilled off leaving behind a glacial acetic acid residue which is recovered from the bottom of the column.

In catalytically dehydrogenating the ethyl alcohol any suitable catalyst may be used such as for example copper or an oxide of copper with or without such additional materials as magnesium oxide, zinc oxide, alkali and alkaline earth compounds such as carbonates, borates etc. Likewise where an oxidation catalyst is used in the oxidation step any suitable catalyst may be used such as metal salts and particularly the organic salts of heavy metals such as cobalt, nickel or copper acetate, propionates or butyrates or mixtures of such salts.

The residue from the acetaldehyde distillation in unit 2 containing principally ethyl alcohol, ethyl acetate and water is passed from the bottom of this unit through line 10 to fractionation column 4.

In accordance with the present invention, alcohol which is substantially free of ethyl acetate is recovered in the fractionating column 4 and is re-cycled to the dehydrogenating unit 1.

This is done by providing, in unit 4, a fractionating column of sufficient height and containing a sufficient number of plates to permit a head fraction to pass from the top of the fractionating column 4 which is rich in ethyl acetate. At the same time, at a plate or plates, below the top plate in the fractionating column, a stream may be withdrawn which is composed of ethyl alcohol, substantially free of ethyl acetate.

As shown in the drawing, the fractionating column 4 is provided with 44 plates. This arrangement permits withdrawing a top fraction which is relatively rich in ethyl acetate as compared to the ethyl acetate content entering the bottom of the fractionating column through line 10. It also permits the withdrawing from a zone, in the zone of plates 35 to 40, an alcohol fraction which is substantially free of ethyl acetate.

A fractionating column of any desired size may be used with a greater or lesser number of plates so long as the tower permits the withdrawal of an alcohol fraction from the top plate which is relatively rich in ethyl acetate as compared to the ethyl acetate content of the liquid to be fractionated and also to permit the withdrawal from a plate, or plates, below the top plate, of an alcohol fraction substantially free of ethyl acetate.

For best results the tower should be of such size and containing a sufficient number of plates so as to permit the withdrawal of an alcohol stream substantially free of ethyl acetate from the 5th to the 10th plate below the top plate in the column.

As shown in the drawing, the incoming stream 10 to the fractionating column 4 is separated into two streams, one of which is an alcohol stream substantially free of ethyl acetate and the other is an alcohol stream relatively rich in ethyl acetate. The alcohol stream substantially free of ethyl acetate is withdrawn from plate 39 through valved line 11 and from plate 35 through valved line 12. Lines 11 and 12 lead into line 13 and may pass through cooler 14 after which the cooled alcohol passes through line 15 to dehydrogenator 1.

The vapors rich in ethyl acetate from the top plate 44 in the fractionating column may pass through line 16 into condenser 17; the condenser being provided with an exhaust vent 18 to vent uncondensed gases to the atmosphere. The condensate from the condenser 17 is withdrawn through line 19 passing into the container 20 where the stream may be divided. One stream may be returned, as reflux, to the top plate 44 of the fractionating column by passing through line 21, reflux pump 22 and line 23. When reflux is used, any desired reflux ratio may be used so long as the desired separation of the ethyl alcohol from the ethyl acetate takes place in the column. The remainder of the stream passes through line 24 through cooler 25 and line 26 to the oxidizing unit 3, entering this latter unit at a point adjacent to the acetaldehyde inlet which enters the oxidizer through line 6.

By my invention the ethyl acetate content can be controlled by increasing the feed to the oxidation unit as the ethyl acetate content of the re-cycled alcohol increases, and by decreasing the feed to the oxidation unit as the ethyl acetate content of the re-cycled alcohol decreases.

Ethyl acetate, ethyl alcohol and water form an azeotropic mixture, boiling at 69.8° C., having a composition by weight of 83% ethyl acetate, 9% ethyl alcohol and 8% water. By providing a sufficient number of plates and/or a sufficient reflux ratio in fractionating column 4, it is possible, at least theoretically, to distill off the top plate of the column and to collect a condensate from the condenser 17, which is virtually the composition of an azeotropic mixture. Thus, all of the ethyl acetate entering the fractionator through line 10, may be removed through line 16 with a minimum amount of alcohol and, in such case, a minimum amount of condensate from the condenser 17 is passed through line 24 to oxidizer 3.

While an azeotropic mixture may be withdrawn through line 16, it is not essential for the successful practice of the present invention. It is sufficient merely if a substantial enrichment in the ethyl acetate content takes place in the alcohol distilled off the top plate of the column as compared to the ethyl acetate content of the alcohol coming into the fractionator.

I have found that it is possible to take a stream from the condenser 17 which is rich in ethyl acetate, and which contains at least 3-5% of ethyl acetate and to withdraw from plates 35 and 39, through lines 11 and 12, respectively, an alcohol stream which has an ethyl acetate content of about 0.25% or less. This may be accomplished with a reflux ratio of 1.0 to 2.5. Reflux ratios above or below this range may be used depending upon the operating conditions and the number of plates in the column.

The present invention may be embodied in other specific forms without departing from the spirit or essential attributes thereof, and it is therefore desired that in all respects as illustrative and not restrictive, reference being had to the appended claims rather than to the foregoing description to indicate the scope of the invention.

I claim:

1. A process for the production of acetic acid which comprises dehydrogenating ethyl alcohol under dehydrogenating conditions thereby forming a mixture containing acetaldehyde, ethyl acetate and unreacted alcohol, separating the acetaldehyde from said mixture, passing the residue from said aldehyde separation to a distillation zone having therein a plurality of fractionating zones, fractionally distilling said residue in said distillation zone under reflux conditions, withdrawing an alcohol head fraction from the top fractionating zone which is rich in ethyl acetate as compared to the ethyl acetate content of said residue, withdrawing an alcohol fraction which is substantially free of ethyl acetate from a fractionating zone below the top fractionating zone in said distillation zone, recycling said last mentioned alcohol fraction to the dehydrogenating step, passing said acetaldehyde and said alcohol head-fraction to an oxidation zone, oxidizing the resulting mixture of acetaldehyde and alcohol therein under oxidizing conditions to acetic acid, passing the products of said oxidation to an acid recovery zone and recovering the acetic acid therein.

2. A process for the production of acetic acid which comprises passing ethyl alcohol over a dehydrogenating catalyst under dehydrogenating conditions and at a temperature of about 480° C. thereby forming a mixture containing acetaldehyde, ethyl acetate and unreacted alcohol, separating the acetaldehyde from said mixture, passing the residue from said aldehyde separation to a distillation zone having therein a plurality of fractionating zones sufficient in number to permit the withdrawal of a head fraction from the top fractionating zone which is relatively rich in ethyl acetate as compared to the ethyl acetate content of said residue, fractionally distilling said residue in said distillation zone under reflux conditions, withdrawing an alcohol head fraction from the top fractionating zone which is rich in ethyl acetate as compared to the ethyl acetate content of said residue, withdrawing an alcohol fraction containing less than 0.25% of ethyl acetate from a fractionating zone below the top fractionating zone in said distillation zone, recycling said last mentioned alcohol fraction over the dehydrogenation catalyst, passing said acetaldehyde and said alcohol head fraction to a catalytic oxidation zone, oxidizing the resulting mixture of acetaldehyde and alcohol therein under oxidizing conditions to acetic acid, passing the products of said oxidation to an acid recovery zone and recovering the acetic acid therein.

3. A process for the production of glacial acetic acid comprising dehydrogenating ethyl alcohol under dehydrogenating conditions thereby forming a mixture of acetaldehyde, ethyl acetate and unreacted alcohol, separating the aldehyde from said mixture, passing the residue from said aldehyde separation to a distillation zone containing a plurality of fractionating zones, fractionally distilling said residue therein under reflux conditions, withdrawing from the top of said distillation zone an alcohol head fraction relatively rich in ethyl acetate as compared to the ethyl acetate content of said residue, withdrawing an alcohol fraction which is substantially free of ethyl acetate from a zone below the top fractionating zone in said distillation zone, recycling said last mentioned alcohol fraction to the dehydrogenation step, passing said acetaldehyde and said alcohol head fraction to an oxidation zone, oxidizing therein under oxidizing conditions the resulting mixture of acetaldehyde and alcohol thereby forming a mixture of acetic acid, water, ethyl acetate, unreacted aldehyde and alcohol, passing said last mentioned mixture to a separation zone, separating a mixture of acetic acid and water therein, passing said acetic acid and water mixture to a dehydrating zone, dehydrating the acetic acid therein to glacial acetic acid and recovering said glacial acetic acid.

4. A process for the production of glacial acetic acid comprising passing ethyl alcohol over a dehydrogenation catalyst under dehydrogenating conditions and at a temperature of about 480° C. thereby forming a mixture containing acetaldehyde, ethyl acetate and unreacted alcohol, separating the acetaldehyde from said mixture, passing the residue from said aldehyde separation to a distillation zone having therein a plurality of fractionating zones sufficient in number to permit the withdrawal of a head fraction from the top fractionating zone which is relatively rich in ethyl acetate as compared to the ethyl acetate content of said residue, continuously fractionally distilling said residue in said distillation zone under reflux conditions, withdrawing an alcohol head fraction from the top fractionating zone which is rich in ethyl acetate as compared to the ethyl acetate content of said residue, withdrawing an alcohol fraction containing less than 0.25% by weight of ethyl acetate from a fractionating zone below the top fractionating zone in said distillation zone, recycling said last mentioned alcohol fraction over the dehydrogenation catalyst, passing said acetaldehyde and said alcohol head fraction to a catalytic oxidation zone, oxidizing therein under oxidizing conditions the resulting mixture of acetaldehyde and alcohol thereby forming a mixture of acetic acid, water, ethyl acetate, and unreacted aldehyde and alcohol, separating a mixture of acetic acid and water from said last mentioned mixture, passing the acetic acid-water mixture to a dehydrating zone, adding a sufficient amount of a dehydrating agent thereto to form an azeotropic mixture with the water in said acid, distilling off from the dehydrating zone an azeotropic mixture of said dehydrating agent and water, and recovering a glacial acetic acid residue from the azeotropic distillation.

5. In the method of manufacture of glacial acetic acid in which ethyl alcohol is dehydrogenated to acetaldehyde by a series of recycling operations over a catalyst at about 480° C., and in which a mixture rich in acetaldehyde is separately oxidized to acetic acid, the improvement which consists of firstly, separating by continuous fractional distillation under adequate multiplate and reflux conditions substantially all ethyl acetate from that portion of the ethyl alcohol recycled over the dehydrogenation catalyst, whereby the effective life of the dehydrogenation catalyst is greatly prolonged, whereby tar formation in the dehydrogenation zone is greatly reduced and whereby the overall yield of acetic acid from ethyl alcohol is increased and secondly, oxidizing the thusly separated ethyl acetate to acetic acid in said mixture rich in acetaldehyde, whereby the overall yield of acetic acid from ethyl alcohol is increased.

JACOB L. STEIN.

References Cited in the file of this patent

UNITED STATES PATENTS

| Number | Name | Date |
|---|---|---|
| 1,951,280 | Hale et al. | Mar. 13, 1934 |
| 2,136,613 | Guinot | Nov. 15, 1938 |
| 2,173,111 | Hasche | Sept. 19, 1939 |
| 2,204,652 | Beudworth | June 18, 1940 |
| 2,425,882 | Hull | Aug. 19, 1947 |
| 2,530,512 | Drewitt | Nov. 12, 1950 |